US010527414B2

(12) United States Patent
Hunter (10) Patent No.: US 10,527,414 B2
(45) Date of Patent: Jan. 7, 2020

(54) MONITORING AN ENVIRONMENT (71) Applicant: 3D Laser Mapping Limited, Nottingham (GB)

(72) Inventor: Graham Hunter, Nottinghamshire (GB)

(73) Assignee: 3D LASER MAPPING LIMITED, Bingham (GB)

(*) Notice: Subject to any disclaimer, the term of this patent is extended or adjusted under 35 U.S.C. 154(b) by 365 days.

(21) Appl. No.: 15/055,176

(22) Filed: Feb. 26, 2016

(65) Prior Publication Data
US 2016/0265914 A1    Sep. 15, 2016

(30) Foreign Application Priority Data
Feb. 27, 2015 (GB) .................................. 1503300.4

(51) Int. Cl.
*G01C 7/02* (2006.01)
*G01C 7/06* (2006.01)
*H04W 4/029* (2018.01)
*H04W 4/024* (2018.01)

(52) U.S. Cl.
CPC ................. *G01C 7/02* (2013.01); *G01C 7/06* (2013.01); *H04W 4/029* (2018.02); *H04W 4/024* (2018.02)

(58) Field of Classification Search
CPC .................................. G01C 7/02; H04W 4/029
See application file for complete search history.

(56) References Cited

U.S. PATENT DOCUMENTS

| 2008/0156124 A1* | 7/2008 | O'Connor | B01F 5/241 73/866 |
| 2010/0208244 A1 | 8/2010 | Earhart et al. | |
| 2011/0123135 A1 | 5/2011 | Hsieh | |
| 2013/0083964 A1* | 4/2013 | Morris | G01S 17/023 382/103 |

(Continued)

FOREIGN PATENT DOCUMENTS

| GB | 2270438 | 9/1994 |
| GB | 2342640 | 4/2000 |

(Continued)

OTHER PUBLICATIONS

United Kingdom Intellectual Property Office, Application No. GB1503300.4, Search Report, dated Aug. 12, 2015, 4 pages.

*Primary Examiner* — Marc Anthony Armand
(74) *Attorney, Agent, or Firm* — Perkins Coie LLP (57) ABSTRACT

The technology relates to a system and method for monitoring an environment. The method comprises receiving first and second sets of data from a plurality of mobile units, wherein the first set of data is associated with a first temporal indicator, the second set of data is associated with a second temporal indicator and each mobile unit comprises: a position determining device configured to generate position data associated with a position of the mobile unit within the environment, and a laser scanning device configured to generate scan data based on a scan of at least part of the environment; determining a first parameter associated with the first set of data; determining a second parameter corresponding to the first parameter and associated with the second set of data; and determining a difference between the first and second parameters.

21 Claims, 5 Drawing Sheets

(56) References Cited

U.S. PATENT DOCUMENTS

2015/0379766 A1* 12/2015 Newman ............... G01S 17/87
356/5.01
2016/0170089 A1* 6/2016 Collins ................ G01S 17/89
702/5

FOREIGN PATENT DOCUMENTS

GB          2507560         7/2014
WO       2008058308        5/2008

\* cited by examiner

MONITORING AN ENVIRONMENT

CROSS REFERENCE TO RELATED APPLICATION

This patent document claims priority and benefits of United Kingdom Patent Application Number 1503300.4, entitled "MONITORING AN ENVIRONMENT", filed with the United Kingdom Intellectual Property Office on Feb. 27, 2015. The entire disclosure of the above application is incorporated by reference as part of this document.

TECHNICAL FIELD

The document relates to the field of environment monitoring and in particular, although not exclusively, relates to providing laser scanned maps of an environment such as a mine or other industrial site.

BACKGROUND

Site scanning devices, such as terrestrial laser scanning devices, have applications in sites such as quarries, railway sidings, mines or land fill locations, where they are used to monitor the effect of human activities and subsidence in those locations. For example, site scanning devices can be used to measure and monitor the stability of rock faces, landslips and man-made structures or used for ongoing, periodic measurements of volumes, stockpiles, cutbacks and waste dumps. Such devices can also perform geotechnical analysis of rock mass structure and behaviour.

Typically, such monitoring activities involve either leaving a site scanning device in-situ for an extended period, or repeatedly setting up equipment in a location, performing a measurement, and then removing the equipment. Using conventional techniques, it can be difficult and time consuming to monitor extensive environments, such as mines or other industrial sites.

SUMMARY

According to a first aspect, there is provided a method for monitoring an environment. The method comprises: receiving first and second sets of data from a plurality of mobile units, wherein the first set of data is associated with a first temporal indicator, the second set of data is associated with a second temporal indicator and each mobile unit comprises: a position determining device configured to generate position data associated with a position of the mobile unit within the environment, and a laser scanning device configured to generate scan data based on a scan of at least part of the environment. The method further comprises determining a first parameter associated with the first set of data, determining a second parameter corresponding to the first parameter and associated with a second set of data having a second temporal indicator, and determining a difference between the first and second parameters.

The above method addresses the problem of how to improve the monitoring of an environment by determining a change in a parameter of the environment over time based on data from a plurality of mobile units. In this way, data collection at large or complex sites can be eased by using a network of sensors. The provision of a position determining unit with the laser scanner enables the laser scan data to be associated with a geographic location within the environment. In this way, data from multiple scanning devices can be combined in a coherent manner to provide a cohesive map of at least part of the environment. The management of the data collected by the sensors may be improved due to the method associating each set of data with a temporal indicator, which may then be stored together with the collected data.

The environment may be an industrial site such as a mine. The method may be automated. The method may comprise generating a composite map of at least part of the environment using the data received from the plurality of mobile units. The method may comprise providing the composite map to a user. The composite map may be provided to the user by a user device. The method may comprise receiving validation of the composite map from the user. The method may comprise storing the composite map as a validated map in response to the validation. The method may comprise constructing a first map of at least part of the environment based on the first set of data. The method may comprise constructing a second map of at least part of the environment based on the second set of data. The method may comprise calculating the first parameter based on the first map. The method may comprise calculating the second parameter based on the second map. The method may comprise providing the first parameter, second parameter and/or difference between the first and second parameters to a user, for example by a user device. The method may comprise receiving validation of the first parameter, second parameter and/or the difference between the first and second parameters. The method may comprise storing a validated first parameter, second parameter and/or the difference between the first and second parameters in response to the validation.

The received sets of data may comprise one or more maps. Each mobile unit may comprise a processor configured to generate a map based on its determined position and a scan of at least part of the environment. The method may comprise operating equipment within the environment in accordance with the difference between the first and second parameters. The temporal indicator may be one of a time associated with, or record number associated with, a particular set of data. The parameter may be a volume of material at a location in the environment. The method may be performed in real time.

According to a further aspect, there is provided an apparatus or computer program configured to perform the method of any preceding claim.

According to a further aspect, there is provided a system comprising the apparatus and a plurality of mobile units, each mobile unit comprising a position determining device configured to determine a position of the mobile unit within the environment and a laser scanning device configured to scan at least part of the environment.

The apparatus and mobile units may be configured to communicate using a wireless network. The position determining device may comprise one or more of: i) a ground unit for a satellite positioning system, ii) an inertial measurement unit and iii) a node for radio signal triangulation. The laser scanning device may comprise a terrestrial laser scanner or mobile laser scanner. The mobile unit may comprise a second position determining device. The first and second devices may together be configured to determine a position of the mobile unit. Each of the plurality of mobile units may comprise one or more vehicles.

Also disclosed is another method for monitoring an environment. The method comprises receiving first and second sets of data from a plurality of mobile units, wherein the first set of data is associated with a first temporal indicator, the second set of data is associated with a second temporal indicator and each mobile unit comprises a position determining device configured to generate position data associated with a position of the mobile unit within the environment, and a laser scanning device configured to generate scan data based on a scan of at least part of the environment. The method may further comprise any of the features described with respect to the first aspect of the disclosed technology.

There may be provided a computer program, which when run on a computer, causes the computer to configure any apparatus, including a circuit, unit, controller, device or system disclosed herein to perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments will now be described by way of example and with reference to the accompanying drawings in which.

DETAILED DESCRIPTION

Figure 1A:
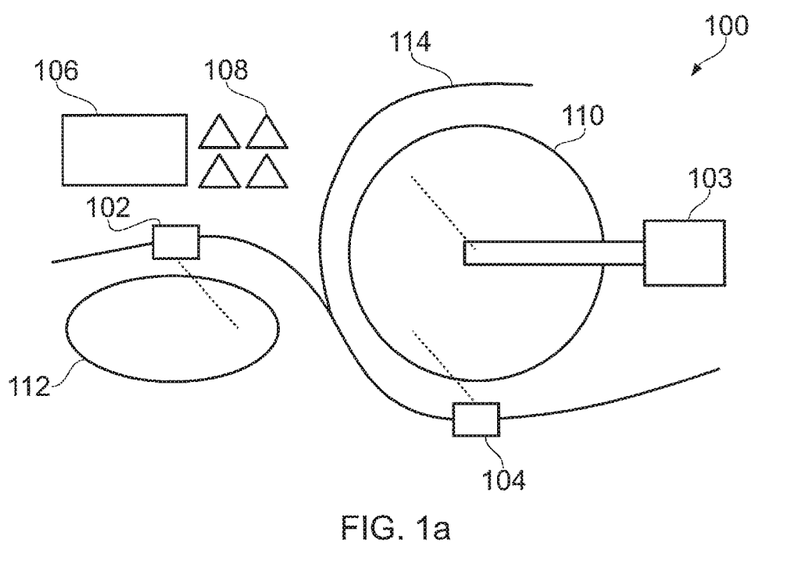
FIGS. 1a and 1b illustrate schematic views of an environment in which a plurality of mobile units is provided.
Figure 1B:
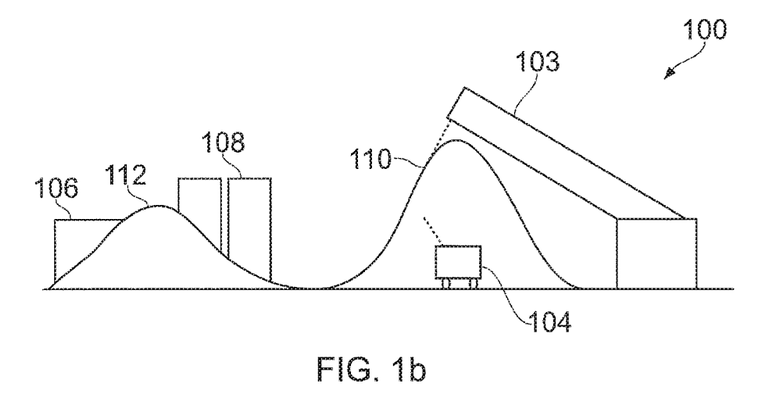

FIGS. 1a and 1b illustrate schematic views of an environment 100 in which a plurality of mobile units 102-104 is provided. A bird's eye view of the environment is shown in FIG. 1a and a side view of the environment is shown in FIG. 1b.

In general, a mobile unit may be provided on, or by, a vehicle, such as land vehicle (for example a car, van, digger, truck, stack reclaimer, crane or loader apparatus), or mounted on a person or other animal. In this example, the mobile units 102-104 include two road vehicles 102, 104 and a stacker 103.

The environment 100 in this example covers a number of hectares and provides a storage area for a mine. The environment 100 includes a building 106 having a remote computer, an arrangement of storage tanks 108 or other features adjacent to the building, a first stockpile 110 and a second stockpile 112. A route 114 for the road vehicles 102, 104 to pass through the environment 100 is provided around and the first and second stockpile 110, 112. The stacker 103 is positioned for adding materials to the first stockpile 110.

Each mobile unit 102-104 comprises a position determining device, a laser scanning device, a transmitter or transceiver and, optionally, a local processor. In addition, other sensors may be provided in a mobile unit 102-104 in order to record additional sensor data, such as audio, video or photo data.

Each position determining device is configured to generate position data associated with a position of the mobile unit with which it is associated within the environment. Each position determining device may comprise one or more of: i) a ground unit for a satellite positioning system (such as a global positioning system, GPS, or real-time kinematic RTK GPS, Galileo, Compass or GLONASS), ii) radar, iii) an inertial measurement unit (IMU), iv) an accelerometer, v) an odometer or vi) a radio signal triangulation node (such as a GSM or another telephony standard for cellular devices). In some examples, a mobile unit may comprises two or more position determining devices so that data from the devices within the unit may be combined in order to provide a more precise estimate of the position of the mobile unit.

In use, a scanning laser beam emanates from each of the laser scanning devices in order to scan the field of view surrounding the respective mobile unit 102, 103, 104. Each laser scanning device is configured to capture scan data based on its field of view. Captured scan data may be stored as a point cloud representing the distances between the scanning device and a plurality of scanned points. Each laser scanning device may comprise a terrestrial laser scanner, which may be a two-dimensional or three-dimensional laser scanner such as the LMS-Q20 by RIEGL Laser Measurement Systems GmbH, for example. A two-dimensional laser scanner with a positioning device may also be referred to as a mobile laser scanner.

The combination of scan data and positional data enables the scan data to be associated with a specific geographic location and so form the basis of a map, or terrain model. Optionally, the local processor is configured to generate a map, or terrain model, based on its determined position and a scan of at least part of the environment in order to provide distributed data processing. The transmitter or transceiver may be configured to transmit the processed map to the remote computer. Alternatively, the transmitter or transceiver may be configured to transmit unprocessed scan data and positional data to the remote computer for processing at the remote computer. The mobile unit or the computer may be configured to compensate for any displacement between the laser scanning device and the positioning device when generating the map.

Two examples of vehicles having an integrated mobile unit are described below with reference to FIGS. 2a, 2b, and 3. Operation of the mobile units illustrated in FIGS. 1a and 1b is described further below with reference to FIG. 4.

Figure 2A:
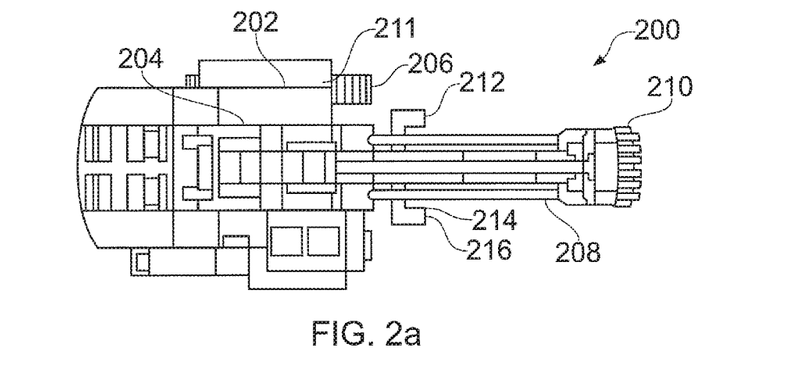
FIGS. 2a and 2b illustrate a mobile unit with a position determining device and a laser scanning device.
Figure 2B:
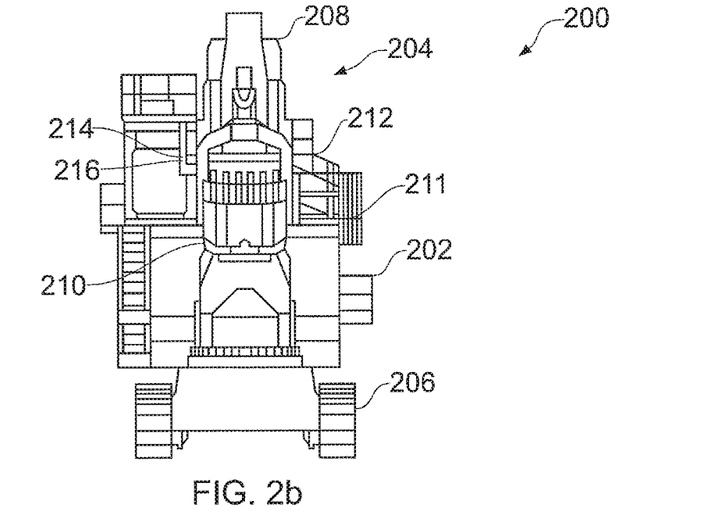

FIGS. 2a and 2b illustrate schematic views of an excavator 200 comprising a mobile unit for use in the environment of FIG. 1. FIG. 2a illustrates a top-down view of the excavator 200. FIG. 2b illustrates a front view of the excavator 200.

The excavator 200 comprises a body 202 providing a cabin 204 for an operator. The body is rotatably mounted on a drive portion 206 having sets of tracks. A mechanical arm 208 extends from a forward facing aspect of the body 202. A scoping portion 210 is provided at an end of the arm 208, distally from the body 202.

The mobile unit is distributed about the excavator 200. A plurality of laser scanning devices 210, 212, 214 are mounted on the mechanical arm 208 and configured to generate scan data based on a scan of the locality of the environment that is situated in front of, and to the sides of, the mechanical arm 208 of the excavator 200. In this way, a detailed view of the area in which the excavator 200 is working may be obtained using the laser scanning devices 210, 212, 214. The mobile unit comprises a GPS/IMU device 211 configured to generate position data associated with a position of the excavator 200. An initial estimate of the terrain data may be created using the position data and the scan data. An improved estimate may then be determined by comparing the initial estimate with a known map of the environment.

Figure 3:
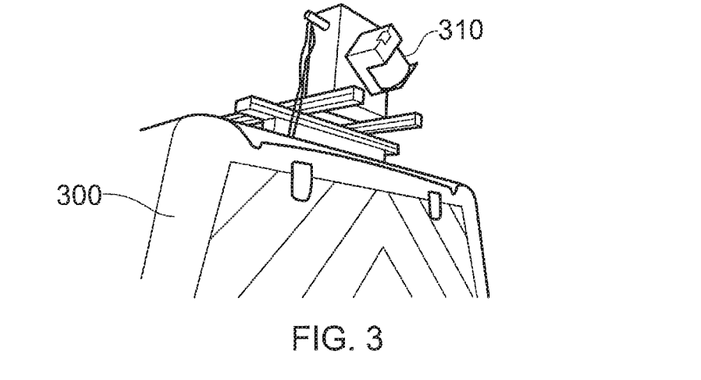
FIG. 3 illustrates another mobile unit with a position determining device and a laser scanning device.

FIG. 3 illustrates a van 300 with a laser scanning device 310 of a mobile unit attached to its rear. One or more position determining units (not shown) may be provided within the van 300. The van 300 may be used to build and/or provide data regarding a site while it is being driven around the site undertaking the operator's normal business. That is, data may be collected passively by the van 300 whilst the operator is conducting other, non-monitoring, tasks.

In general, any road or land vehicle may be used instead of a van and the laser scanning unit may be provided facing in any direction from the vehicle. Such vehicle-mounted units can provide automated scanning of all areas of volume change in a mine, such as working faces, stockpiles, areas of construction work and areas being cleaned-up with dozers.

Figure 4:
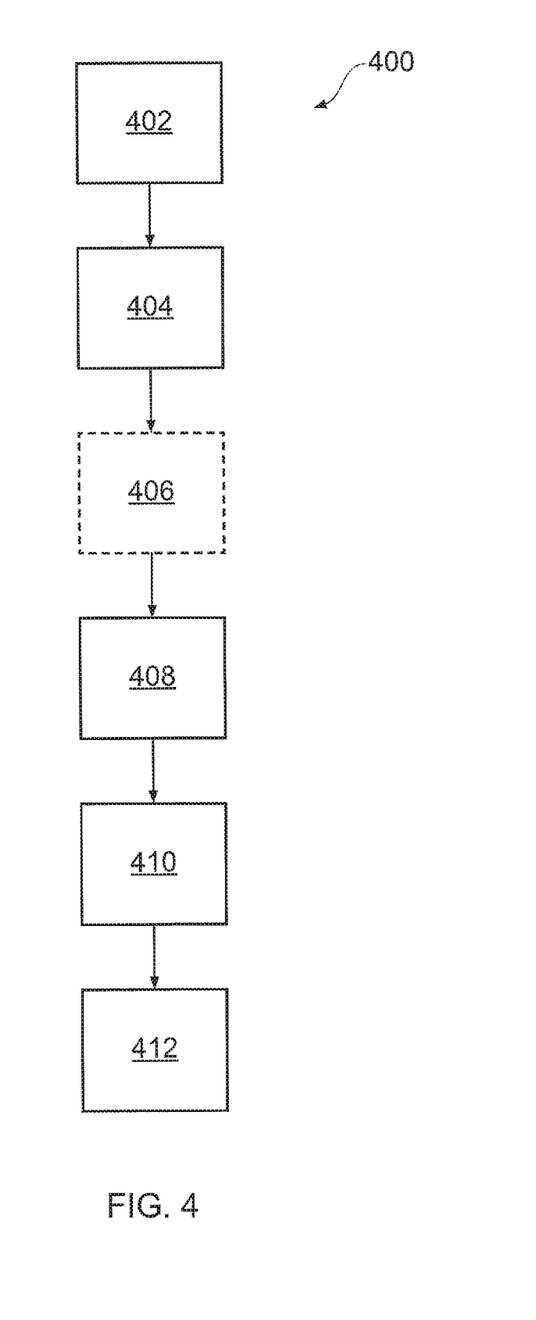
FIG. 4 illustrates a method of monitoring an environment such as the environment described with reference to FIG. 1.

FIG. 4 illustrates a flow diagram for an automated method 400 of monitoring an environment such as that described with reference to FIG. 1.

The method 400 comprises receiving 402 first and second sets of data from a plurality of mobile units. The first set of data is associated with a first temporal indicator and the second set of data is associated with a second temporal indicator. A temporal indicator may be provided by a time, such as an initiation or end time, or record/sequence number associated 404 with a particular set of data.

Each set of data can comprise either i) raw positioning data and laser scan data or ii) a map constructed from raw positioning data and laser scan data. For each set of data received from the plurality of mobile units, a composite map of at least part of the environment may be generated 406 in a three dimensional virtual space. Compositing data from a number of sources enables a more thorough or complete map of the environment to be built up at a particular point in time. In addition, because data can be received from the mobile units (and indeed additional static units) in real time, the map of the environment can be maintained more easily and kept up-to-date. In the case where data is continuously collected, a set of data may be associated with a specific interval in time, such as data collected within a one hour period. The duration of the interval can be chosen depending upon the level of precision that is required in the map and the rate at which material is expected to be deposited in, or removed from, the environment.

A first parameter, such as a volume of material in the first stockpile in FIG. 1 or a slope angle of the first stockpile, is determined 408 from the first set of data. A second parameter corresponding to the first parameter is determined 410 from the second set of data. The evolution of the parameter as a function of time may be calculated by determining 412 a difference between the first and second parameters. The method 400 may be performed on a daily basis, for example, so that each set of data corresponds to a different day. The steps 408-412 of determining information from the sets of data may be performed by comparing features of maps formed from the respective sets of data as discussed further below with reference to FIGS. 5 and 6.

In some examples, the method may further comprise automatically or manually operating equipment within the environment in accordance with the difference between the first and second parameters. For example, equipment such as a conveyor belt, drag line, shovel or stack reclaimer may be configured to automatically start or stop operation in accordance with the difference between the first and second parameters. Alternatively, the method may comprise providing the parameter to a user. The user can then control equipment within the environment in accordance with the difference between the first and second parameters. The first and second parameters or the difference between the first and second parameters may also provide important information for stock control or audit purposes in some environments, such as mines. The difference between the first and second parameters may therefore be used in planning further mining operations, such as designing or redesigning a mine.

Figure 5:
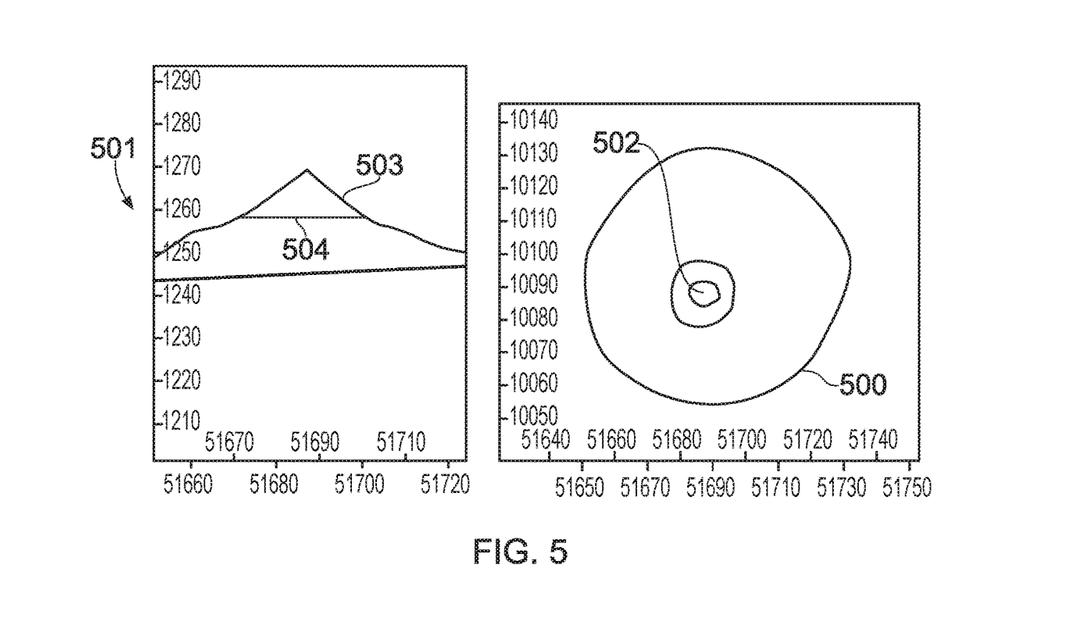
FIGS. 5 and 6 illustrate composite maps generated from sets of data from mobile units.

FIG. 5 illustrates a two representation 500, 501 of a map of a stockpile, such as the first or second stockpile shown in FIG. 1.

Scan data from the mobile units is represented by a point cloud. By treating each point of scan data as a node on a surface, a map (or terrain model) of the environment can be built up. Parameters such as an angle between two nodes, or a volume within a surface, can be calculated for each data set. The view of a three dimensional point cloud can be manipulated after a map has been constructed to be viewed from a different angle to that which was used to obtain the scan data.

A first representation 500 on the right hand side of FIG. 5 shows a bird's eye view of the stockpile with the height of each measured point represented as a function of a (x,y) position on the ground. The highest point of the stockpile is in the centre 502. The first representation 500 illustrates a gradient in height between the centre 502 and the ground.

A parameter may be determined by interrogating the map. For example, a second representation 501 on the left hand side of FIG. 5 shows a two dimensional cross section 503 taken through the stockpile. A diameter 504 at a given height of the stack, which is an example of a parameter, is shown in the second representation.

By comparing corresponding parameter in maps of the same environment that have been collected at different times a change in the parameter between collecting data for the different maps may be determined. For example, the method of FIG. 4 may comprise calculating the first parameter based on a first map associated with the first set of data and calculating the second parameter based on a second map associated with the second set of data.

Figure 6:
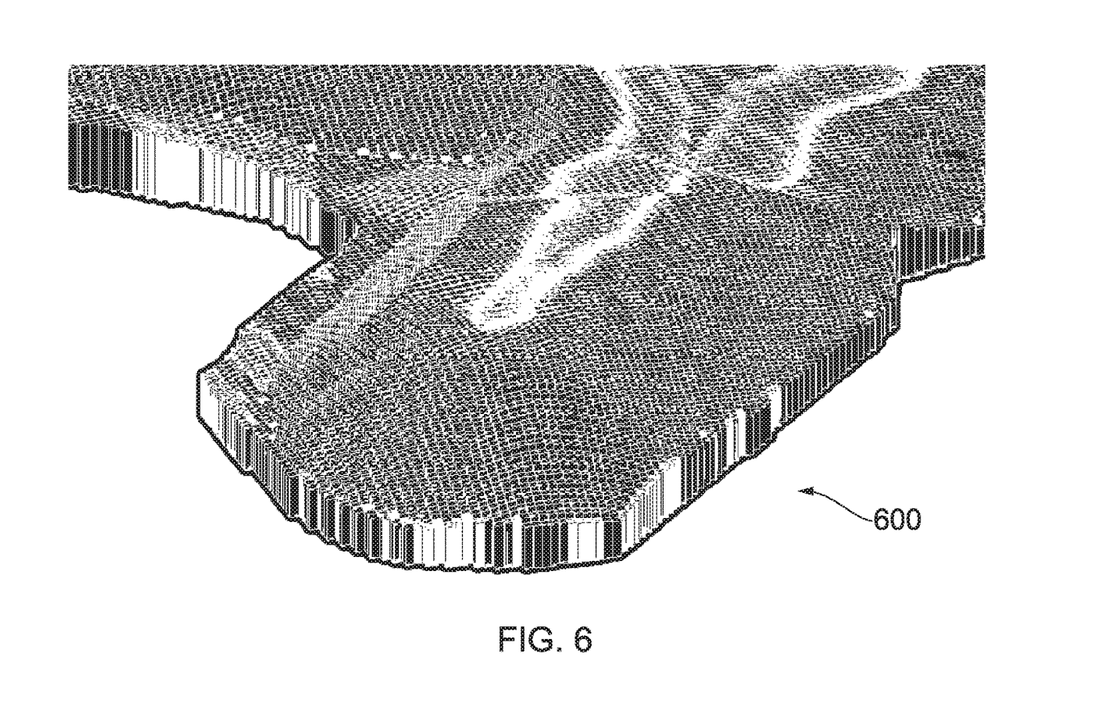

FIG. 6 illustrates a representation 600 of a map of another stockpile, such as the first or second stockpile shown in FIG. 1. In this representation 600, a three dimensional surface has been generated from point cloud data. Surface elements between points are coded to provide an indication of the gradient of the surface. The identification of high gradient regions can be used to predict subsidence or slippage of the stockpile, which may enable site safety to be improved.

Figure 7:
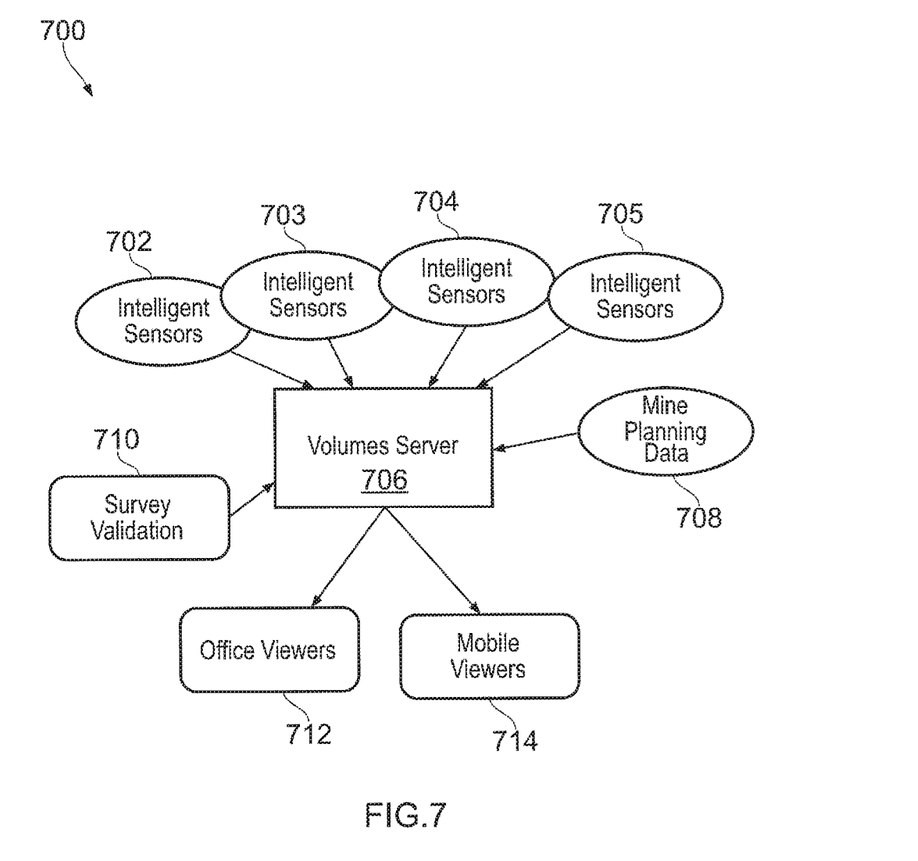
FIG. 7 illustrates a block diagram for an apparatus configured to perform the method described with reference to FIG. 4 using a plurality of mobile units such as those described with reference to FIG. 1.

FIG. 7 illustrates a block diagram for a system 700 configured to perform the method described with reference to FIG. 4 using a plurality of mobile units 702-705 such as those described with reference to FIG. 1. The system may be used to monitor a slope and/or volume of a stockpile in an environment.

The computer 706, mobile units 702-705 and user devices 712, 714 are configured to communicate in a network. The network may be a wireless local area network (WLAN), which may be advantageous because in some cases the infrastructure for providing a WLAN is already present at the environment. The provision of a secondary network medium, such as a telephony standard (for example, GSM, GPRS, 2G, 3G or 4G) or satellite communication link may improve the reliability of the system for some applications. Data may be sent over the network using a variety of protocols, such as, e.g., direct file transfer or an email protocol.

In some embodiments, the system 700 comprises a computer 706, or volumes server 706 that may include one or more memory and one or more processors, the processor implementing: receiving data from the mobile units 702-705, determining a first parameter associated with the first set of data, determining a second parameter corresponding to the first parameter and associated with the second set of data, and determining a difference between the first and second parameters.

The computer 706 may also provide output including the determined difference between the first and second parameters, and optionally one or more maps, to a plurality of user devices 712, 714. In some examples, the computer 706 may also autonomously control equipment within the environment in response to a change in the determined parameter. The computer 706 may treat each separate device using a separate thread. Separate threads may be processed in parallel in order to improve the performance of the system in some applications.

Initially, the computer 706 is provided with a plan of the environment 708, which may be stored in a similar format to scan data in order to enable comparison between the plan and the scan data. The computer 706 can be used to log all access to a map for auditing purposes and to ensure data integrity. All log entries may be saved when the system is closed to ensure data security.

The mobile units 702-705 provide intelligent sensors in this example. An intelligent sensor provides a sensor and a processor in a single unit. A sensor unit with only the functions of detecting and sending an unprocessed signal to an external system is not considered intelligent. An intelligent sensor can combine positional data and laser scanning data in order to generate a map of the locality of the sensor at a particular mobile unit. The intelligent sensors of the mobile units 702-705 provide a distributed processing arrangement in which processing tasks are shared. The mobile units 702-705 are each configured to determine a map of its locality and perform a real-time validity check of the map. The validity check is achieved by the mobile units 702-705 obtaining the latest map of its locality from the computer 706. The computer 706 can optionally make a record of any map regions that have been "checked-out" for local processing at a mobile unit 702-705. The mobile units 702-705 determine whether a stored map from the computer 706 matches a new map generated from a scan of its local area. If there are differences between the stored map and the new map then it is determined that the area has changed and so the new map is sent to the computer 706. The distribution of processing between the mobile units 702-705 and computer 706 in this way can reduce the communication bandwidth required by the system as a whole and/or reduce the processing power required by the server.

The computer 706 is configured to store each new map area with an associated temporal indicator, such as a session identifier or date. The computer 706 may retain each old map area, which has been replaced by a new map area, for a predetermined period of time such as 30 days. After the predetermined period of time has elapsed the old map may be deleted.

Each user device 712, 714 may be provided as a fixed terminal 712 for office use or as a mobile device 714, such as a computing tablet or smart phone, for field use.

Manual validation of the new map areas can be performed on user devices 712, 714 in order to ensure that the new map regions provide physically accurate data. The computer 706 may maintain two maps of at least part of the environment. One of the two maps is a working, or real-time, model and the other of the two maps is a validated model. The real time map may be continuously updated using data provided by the mobile units 702-705 as discussed above. The validated model may be updated using the real time model after the real time model has been validated by a user. In the mining industry, for example, a mine surveyor has a legal responsibility for creating accurate mine plans. Obtaining validation from the mine surveyor is often a bottleneck in producing plans that are required in order for efficient and safe operation of the mine. A user, such as a surveyor, can choose to delete a new map area if it is considered to be erroneous, due to the presence of a mobile object such as a person or vehicle in the field of view, for example. Manual validation may be used to fix data, re-calibrate sensor or check the obtained data against previous survey data, for example.

The user devices 712, 714 can provide a number of functions for displaying or analysing maps. A user may choose a map of the environment corresponding to any particular temporal indicator that is stored at the computer 706 for display or analysis. Georeferenced video or photo camera data may be provided as an overlay to a map or plan. Maps, such as those discussed with reference to FIGS. 5 and 6 may be displayed on the user devices 712, 714 in either a two dimensional mode or three dimensional mode.

The user devices 712, 714 may enable comparison of the plan of the environment 708 with a particular map of the environment acquired using the mobile devices. Such data may be of particular interest to a mine foreman because it is common for mines to be dug deeper than planned. At present a site survey is required in order to determine whether there is a divergence between the planned depth and the actual depth in the environment. The difference between the first and second parameters may therefore be taken into account when redesigning the environment.

The user devices 712, 714 may also provide an interface for the user to control equipment within the environment in response to a change in a parameter or to monitor the autonomous control of equipment by the computer 706.

What is claimed is:

1. A method for monitoring an environment at an industrial site, comprising:
   receiving first and second sets of data from a plurality of mobile units, wherein each mobile unit comprises:
      a position determining device configured to generate position data associated with a position of the mobile unit within the environment, and
      a laser scanning device configured to generate scan data based on a scan of at least part of the environment,
      wherein the first and second sets of data each comprise position data and scan data from the plurality of mobile units,
      wherein the first set of data is associated with a first temporal indicator and the second set of data is associated with a second temporal indicator, and
      wherein the second temporal indicator and the first temporal indicator respectively indicate that the second set of data and the first set of data are received at different times;

constructing a first composite map of at least part of the environment based on the first set of data;
constructing a second composite map of at least part of the environment based on the second set of data, wherein the first composite map and the second composite map describe the at least part of the environment at different times;
determining a first volume of material at a location in the environment based on the first composite map associated with the first set of data;
determining a second volume of material at the location based on the second composite map associated with the second set of data; and
determining a difference between the first volume of material and the second volume of material, wherein the determined difference describes a change of the volume of material as a function of time.

2. The method of claim 1 comprising:
providing at least one composite map to a user;
receiving validation of the at least one composite map from the user; and
storing the at least one composite map as a validated map in response to the validation.

3. The method of claim 1 wherein the received sets of data comprise one or more maps, wherein each mobile unit comprises a processor configured to generate a map based on its determined position and a scan of at least part of the environment.

4. The method of claim 1 comprising operating equipment within the environment in accordance with the difference between the first and second volume of material.

5. The method of claim 1 wherein the first temporal indicator or the second temporal indicator includes a time or record number associated with a particular set of data.

6. The method of claim 1, wherein the method is performed in real time.

7. An apparatus configured to:
receive first and second sets of data from a plurality of mobile units, wherein each mobile unit comprises:
a position determining device configured to generate position data associated with a position of the mobile unit within the environment, and
a laser scanning device configured to generate scan data based on a scan of at least part of the environment,
wherein the first and second sets of data each comprise position data and scan data from the plurality of mobile units,
wherein the first set of data is associated with a first temporal indicator, and the second set of data is associated with a second temporal indicator, and
wherein the second temporal indicator and the first temporal indicator respectively indicate that the second set of data and the first set of data are received at different times;
construct a first composite map of at least part of the environment based on the first set of data;
construct a second composite map of at least part of the environment based on the second set of data, wherein the first composite map and the second composite map describe the at least part of the environment at different times;
determine a first volume of material at a location in the environment based on the first composite map associated with the first set of data;
determine a second volume of material at the location based on the second composite map associated with the second set of data; and
determine a difference between the first volume of material and the second volume of material, wherein the determined difference describes a change of the volume of material as a function of time.

8. A system comprising the apparatus of claim 7 and a plurality of mobile units, each mobile unit comprising a position determining device configured to determine a position of the mobile unit within the environment and a laser scanning device configured to scan at least part of the environment.

9. The system of claim 8 wherein the apparatus and mobile units are configured to communicate using a wireless network.

10. The system of claim 8 wherein the position determining device comprises one or more of a ground unit for a satellite positioning system and a radio signal triangulation node.

11. The system of claim 8 wherein the laser scanning device comprises a terrestrial laser scanner or mobile laser scanner.

12. The system of claim 8 wherein the mobile unit comprises a second position determining device and the first and second devices are together configured to determine a position of the mobile unit.

13. The method of claim 1 wherein the apparatus and mobile units are configured to communicate using a wireless network.

14. The method of claim 1 wherein the position determining device comprises one or more of a ground unit for a satellite positioning system and a radio signal triangulation node.

15. The method of claim 1 wherein the laser scanning device comprises a terrestrial laser scanner or mobile laser scanner.

16. The method of claim 1 wherein the mobile unit comprises a second position determining device and the first and second devices are together configured to determine a position of the mobile unit.

17. A computer program provided on a non-transitory computer readable medium, the computer program configured to:
receive first and second sets of data from a plurality of mobile units, wherein each mobile unit comprises:
a position determining device configured to generate position data associated with a position of the mobile unit within the environment, and
a laser scanning device configured to generate scan data based on a scan of at least part of the environment,
wherein the first and second sets of data each comprise position data and scan data from the plurality of mobile units,
wherein the first set of data is associated with a first temporal indicator, the second set of data is associated with a second temporal indicator, and
wherein the second temporal indicator and the first temporal indicator respectively indicate that the second set of data and the first set of data are received at different times;
construct a first composite map of at least part of the environment based on the first set of data;
construct a second composite map of at least part of the environment based on the second set of data, wherein the first composite map and the second composite map describe the at least part of the environment at different times;

determine a first volume of material at a location in the environment based on the first composite map associated with the first set of data;

determine a second volume of material at the location based on the second composite map associated with the second set of data; and determine a difference between the first volume of material and the second volume of material, wherein the determined difference describes a change of the volume of material as a function of time.

18. The method of claim 1, wherein the industrial site is a mine.

19. The method of claim 1, further comprising:

sending, to at least one mobile unit, a first map associated with a location of the at least one mobile unit and associated with a first time;

receiving, from the at least one mobile unit, a second map associated with the location of the at least one mobile unit and associated with a second time that is later in time than the first time; and replacing the first map with the second map in response to a determination by the at least one mobile unit that the first map obtained at the first time is different from a second map obtained at the second time.

20. The apparatus of claim 7, further configured to:

send, to at least one mobile unit, a first map associated with a location of the at least one mobile unit and associated with a first time;

receive, from the at least one mobile unit, a second map associated with the location of the at least one mobile unit and associated with a second time that is later in time than the first time; and replace the first map with the second map in response to a determination by the at least one mobile unit that the first map obtained at the first time is different from a second map obtained at the second time.

21. The computer program of claim 17, further configured to:

send, to at least one mobile unit, a first map associated with a location of the at least one mobile unit and associated with a first time;

receive, from the at least one mobile unit, a second map associated with the location of the at least one mobile unit and associated with a second time that is later in time compared to the first time; and replace the first map with the second map in response to a determination by the at least one mobile unit that the first map obtained at the first time is different from a second map obtained at the second time.

* * * * *